United States Patent Office 3,677,956
Patented July 18, 1972

3,677,956
SYNERGISTIC METAL SEQUESTRANT
Ronald H. Carlson, Lewiston, N.Y., assignor to Hooker Chemical Corporation, Niagara Falls, N.Y.
No Drawing. Continuation-in-part of application Ser. No. 680,011, Nov. 2, 1967. This application July 13, 1970, Ser. No. 54,661
Int. Cl. C02b 5/06; C11d 7/32, 7/36
U.S. Cl. 252—180                      5 Claims

ABSTRACT OF THE DISCLOSURE

Mixtures of tris(hydroxymethyl)phosphine oxide, and iminodiacetic acid as well as the alkali metal salts thereof, exhibit marked synergism as sequestrant compositions over a broad pH range. The sequestrant compositions are useful as additives for detergents, metal cleaning baths, peroxide compositions and dyes. The chelate products are useful in the field of agriculture for the introduction of trace elements into plant life and especially in the treatment of iron chlorosis in plants.

RELATED APPLICATIONS

This application is a continuation-in-part of Ser. No. 680,011, filed Nov. 2, 1967 now abandoned.

BACKGROUND OF THE INVENTION

The invention relates to synergistic sequestrant mixtures, their use and the chelated products thereof.

The use of complexing agents which combine with metal ions in solution to form soluble complexes (which agents are commonly referred to as sequestrants) is of great importance in many industrial processes inasmuch as it may prevent undesired precipitation reactions from occurring. For example, sequestration of calcium is important in water treatment and in laundry solutions for controlling hardness of the water. Sequestration of the heavy metals such as copper and nickel is essential in such areas as textile processing and metal cleaning and finishing. Not all sequestrants, however, are equally effective, their activity varying with their structures and the conditions under which they are used; for example, the common carboxylic acid sequestrants are often ineffective in preventing ferric ion precipitation from alkaline solutions of pH greater than 8.

The commercial utilization of water-soluble chelating compounds in agricultural applications to provide trace elements for plant growth is well known. Likewise, the treatment of plants suffering from chlorosis as a result of growth in alkaline soils devoid of sufficient assimilatable iron is known. Various chelating agents have been employed in the past to correct iron deficiencies in plants, the water solubility of chelated metal ions affords the primary route for potential assimilation into a plant structure.

Ethylenediaminetetraacetic acid (EDTA) has been employed in the past for treatment of iron deficiencies of citrus trees under acid conditions. The EDTA iron chelates are not stable in neutral and alkaline media. The development of sequestrants which may be employed in acid media as well as alkaline media is significant not only for agricultural applications, but for use in the detergent field, metal cleaning field, textile and dye industry and as stabilizers for organic and inorganic peroxides.

SUMMARY OF THE INVENTION

In accordance with the instant invention, there is provided compositions of matter comprising tris(hydroxymethyl)phosphine oxide and at least one member selected from the group consisting of iminodiacetic acid, and the alkali metal salts thereof, in mole ratio of about 10/90 to 90/10.

Furthermore, in accordance with the instant invention, there is provided a process for sequestering metal ions from aqueous solution over a pH range of about 4 to 11 by reacting the sequestrant mixture of this invention with metal ions.

Also, this invention provides novel compositions of matter comprising the sequestered metal ion derivatives of the sequestrant mixtures of this invention.

DETAILED DESCRIPTION OF THE INVENTION

Mixtures of tris(hydroxymethyl)phosphine oxide (THPO) and iminodiacetic acid (IDA), and its alkali metal salts unexpectedly display marked synergistic action as a sequestrant composition in mole ratios within the range from about 10/90 to 90/10, generally at a pH of from 4 to 11.

The metal ions which may be sequestered by the composition of this invention are those cations having a valence of two or more, such as the ions of chromium, copper, nickel, tin, aluminum, cobalt, platinum, palladium, rhodium, iridium, ruthenium, osmium, zirconium, hafnium, the rare earths such as gadolinium, europium, neodymium, the actinides such as uranium, and especially iron in the ferric ($Fe^{+3}$) state.

The tris(hydroxymethyl)phosphine oxide component of the synergistic sequestrant mixture need not be introduced into an aqueous system for containing metal cations as such, because it may be formed in situ in known manner from various known precursors, such as tris(hydroxymethyl)phosphine and tetrakis(hydroxymethyl)-phosphonium halide. Generally, at a pH above 7, the tetrakis(hydroxymethyl)phosphonium salts are converted to the corresponding tris(hydroxymethyl)phosphine which undergoes oxidation to produce the phosphine oxide.

The iminodiacetic acid component of the sequestrant mixtures of this invention is preferably employed as its sodium (SIDA) or potassium (KIDA) salt to increase water solubility.

The synergistic action of the sequestrant composition of this invention varies with the pH of the aqueous system as well as with the mole ratio of the components in the mixture. With mole ratios of tris(hydroxymethyl)phosphine oxide to iminodiacetic acid salt between 10/90 and 30/70, the synergistic action toward ferric iron is evident at pH values from about 4 to 10, whereas with mole ratios between 50/50 and 90/10 the range of synergistic activity extends up to about a pH of 11.

The composition of this invention, when added to those solutions in which sequestration is desired, may be added as a solid or as a solution. If it is desired to add said composition as a solution, the composition may be dissolved in water. From about 0.001 percent to about 50 percent concentration (by weight) may be used, though it is preferred to use from about 0.01 to about 5 percent concentration (by weight), and it is even more preferred to use from about 0.1 to about 3 percent concentration (by weight).

It is preferred to use said compositions as sequestrants in aqueous solutions. When said composition is added to the solution containing metal ions to be sequestered, the temperature of said solution may be from about 0 to about 100 degrees centigrade, though it is preferred that said temperature be from about 20 to about 70 degrees centigrade, and it is even more preferred that said solution be at ambient temperature.

The sequestrant mixture of this invention may be formulated either as an aqueous solution containing the two components in the desired ratio or as a solid mixture.

The sequestered iron chelate may also be employed as an aqueous solution or as a solid. The ferric iron chelate is soluble in aqueous alkaline solution in an amount exceeding 20 percent by weight, and contains more than 10 percent iron on a weight basis. Thus, when compared to the ferric iron chelate of EDTA, which contains a relatively low percentage of iron, 5–10 percent by weight, and which exhibits low solubility in alkaline solution, the sequestrant mixture of this invention presents decided advantages.

The solid ferric ($Fe^{+3}$) iron chelates of this invention are of the general composition $Na_n(Fe_x(THPO)_y(IDA)_z)$ in which $n$, $x$, $y$ and $z$ are numbers greater than 0, and may be prepared by mixing appropriate amounts of ferric chloride, sodium hydroxide, tris(hydroxymethyl)phosphine oxide (THPO) and iminodiacetic acid (IDA) or a salt thereof in aqueous solution. After the reaction is complete, the solid chelate may be forced from solution by addition of a lower alkanol, such as ethanol or isopropanol. The isolated chelate is then dried and ground into a free-flowing brown powder.

EXAMPLE 1

To 45.1 grams of 33.3 percent solution by weight of a 50/50 mole mixture of tris(hydroxymethyl)phosphine oxide and disodium iminodiacetate monohydrate (0.09 mole) was added 25 grams of aqueous solution containing 14.5 grams (0.09 mole) of $FeCl_3$. Sufficient sodium hydroxide was added to adjust the pH of the solution to 7. A clear, dark mahogany colored solution formed above a layer of settled solids. The solution was decanted and 65 milliliters of absolute ethanol was added to it to form a two-phase system. The phases were separated by decantation and the lower chelate containing phase was evaporated to dryness in vacuum (about 29 inches mercury absolute) at 50 degrees centigrade. After drying, a finely divided, free flowing, mahogany colored powder was obtained. Infrared analysis showed the product to contain both THPO and SIDA molecules. The product contained 20.6 percent Fe and was soluble in water in excess of 20 percent by weight. The pH of a 1% by weight aqueous solution of the product was 7.6. The chelated iron product maintained its solubility characteristic in aqueous solutions of about pH 4 to about 12.

EXAMPLE 2

The sequestering efficiency of the sequestrant mixtures of this invention as well as the individual sequestrants were determined by titrating an aqueous solution 0.5 molar in $FeCl_3$ dropwise into a stirred 50 gram aqueous solution containing 0.5 gram of dissolved sequestrant until the end point was reached as observed by a perceptible permanent haze in the solution. The pH of the solution of dissolved sequestrant was initially adjusted to the desired point and maintained at the specified pH during the titration by addition of aqueous sodium hydroxide as needed to control the hydrogen ion concentration.

The sequestering efficiency was then calculated in terms of the pounds of ferric ion sequestered per 100 pounds of sequestrant. A sequestering efficiency designation of 1.00 represents 7.1 pounds of ferric ion sequestered by 100 pounds of sequestrant.

The data presented in Table I compare the sequestering efficiency of tris(hydroxymethyl)phosphine oxide (THPO) and disodium iminodiacetate (SIDA) and mixtures of these two sequestrants in the ratios indicated at the stated pH, for ferric ion. The mole ratio of the components of the synergistic sequestrant mixture is within the range from 10/90 to 90/10.

TABLE I

| pH | THPO | SIDA | THPO/SIDA | | | |
|---|---|---|---|---|---|---|
| | | | 10/90 | 30/70 | 50/50 | 90/10 |
| 4 | 0.4 | 0.7 | 1.1 | 3.8 | 2.9 | 1.3 |
| 5 | 0.3 | 0.6 | 3.8 | 4.7 | 7.7 | 1.6 |
| 6 | 0.2 | 0.5 | 3.6 | 4.8 | 9.1 | 1.8 |
| 7 | 0.2 | 0.7 | 4.5 | 11.6 | 9.2 | 2.1 |
| 8 | 0.1 | 1.0 | 3.8 | 13.4 | 9.8 | 3.3 |
| 9 | 0.4 | 1.0 | 4.3 | 10.5 | 10.3 | 6.0 |
| 10 | 3.6 | 1.0 | 4.1 | 8.1 | 10.5 | 8.2 |
| 11 | 10.1 | 0.5 | 3.4 | 8.3 | 10.8 | 14.2 |
| 12 | 19.7 | 0.2 | 3.1 | 1.0 | 10.8 | 18.2 |

It is clear from the data presented in Table I that mixtures of tris(hydroxymethyl)phosphine oxide and disodium iminodiacetate exhibit synergistic activity in the sequestration of the ferric ion at those pH values below 11 for the 50/50 and 90/10 mixtures and below 10 for all the sequestrant mixture ratios from 10/90 to 90/10.

To further place the instant invention in perspective, the sequestering efficiencies of several known sequestrants for the ferric ion are presented in Table II. The abbreviations employed are as follows:

Trisodium nitrilotriacetate—SNTA
Sodium tripolyphosphate—STPP
Tetrasodium ethylene diaminetetraacetate—SEDTA
Gluconic acid
Trisodium hydroxyethylethylenediaminetriacetate—SHEDTA
Pentasodium nitrilotrimethylene phosphonate—SNTMP
Pentasodium diethylenetriaminepentaacetate—SDTPA

TABLE II

| pH | Sequestering efficiency | | | | | | | | |
|---|---|---|---|---|---|---|---|---|---|
| | 4 | 5 | 6 | 7 | 8 | 9 | 10 | 11 | 12 |
| Sequestrant: | | | | | | | | | |
| SNTA | 3.2 | 2.1 | 1.4 | 1.1 | 1.0 | 0.8 | 0.7 | 0.3 | 0.1 |
| STPP | 1.7 | 1.0 | 0.9 | 0.6 | 1.2 | 1.5 | 1.2 | 0.6 | 0.2 |
| SEDTA | 1.0 | 1.8 | 1.1 | 0.9 | 1.4 | 1.3 | 1.0 | 0.5 | 0.1 |
| Gluconic acid | | | | 6.0 | 6.6 | 6.7 | 6.8 | 4.5 | 3.2 |
| SHEDTA | 2.2 | | 2.2 | 2.6 | 2.6 | 2.4 | 1.5 | 0.8 | |
| SNTMP | | | | | | | | 2.0 | 1.9 | 1.0 |
| SDTPA | | | | 1.3 | 1.3 | 1.6 | 1.9 | 0.9 | 0.5 |

From a comparison of the sequestering efficiencies of the known sequestrants presented in Table II, with the synergistic sequestrant mixture THPO/SIDA presented in Table I, it is apparent that the mixed sequestrant of the instant invention provides completely unexpected activity toward the ferric ion.

What is claimed is:

1. A composition of matter consisting essentially of tris(hydroxymethyl)phosphine oxide and a second member selected from the group consisting of iminodiacetic acid, and an alkali metal salt thereof, in mole ratio of about 10/90 to 90/10.

2. A composition of claim 1 in which the mole ratio of tris(hydroxymethyl)phosphine oxide to said second member is from about 50/50 to 90/10.

3. The composition of claim 1 comprising tris(hydroxymethyl)phosphine oxide and disodium iminodiacetate in mole ratio of about 50/50 to 90/10.

4. A method for sequestering ferric ions in aqueous solution which comprises reacting said ferric ions at a pH about 4–10 with the composition of claim 1.

5. A method for sequestering ferric ions in aqueous solution which comprises reacting said ferric ions at a pH of about 10-11 with the composition of claim 2.

References Cited
UNITED STATES PATENTS

| | | | |
|---|---|---|---|
| 3,578,708 | 5/1971 | Carlson | 260—534 |
| 3,499,842 | 3/1970 | Carlson | 252—180 |
| 3,477,953 | 11/1969 | Carlson | 252—175 |
| 2,583,891 | 1/1952 | Schwarzenbach | 23—230 |
| 2,240,957 | 5/1941 | Munz | 252—152 |

OTHER REFERENCES

"Data Sheet No. 606, Pfizer Aminocarboxylic Chelating Agents," published by Chas. Pfizer & Co., Inc., 20 pages.

LEON D. ROSDOL, Primary Examiner

D. L. ALBRECHT, Assistant Examiner

U.S. Cl. X.R.

71—31, 54, 97; 252—102, 132, 137, 152, 86, DIGS. 11 & 17; 260—534, 606.5 P